United States Patent [19]

Caulkins

[11] Patent Number: 5,441,434

[45] Date of Patent: Aug. 15, 1995

[54] MAGNETIC CONVEYANCE SYSTEM

[76] Inventor: Kenneth B. Caulkins, 4218 Jessup Rd., Ceres, Calif. 95307

[21] Appl. No.: 224,876

[22] Filed: Apr. 8, 1994

[51] Int. Cl.6 .................... A63H 33/26; B65G 35/00
[52] U.S. Cl. .................................. 446/130; 446/135; 446/176; 198/619; 104/154; 362/802
[58] Field of Search ............... 446/135, 136, 176, 130, 446/132, 134, 133; 198/619; 104/154, 155, 283; 273/86 B; 362/802

[56] References Cited

U.S. PATENT DOCUMENTS

| | | | |
|---|---|---|---|
| 3,673,629 | 7/1972 | Casey et al. | |
| 3,882,791 | 5/1975 | Youngscap | 104/154 |
| 3,965,613 | 6/1976 | Saunders | 446/132 |
| 4,034,848 | 7/1977 | Elliott | 198/570 |
| 4,113,202 | 9/1978 | Ueno | |
| 4,457,423 | 7/1984 | Stoll | 198/619 |
| 4,701,146 | 10/1987 | Swenson | 446/130 |
| 4,725,256 | 2/1988 | Sassak | 446/176 |

FOREIGN PATENT DOCUMENTS 1350763 12/1964 France ................. 446/136

Primary Examiner—Mickey Yu
Attorney, Agent, or Firm—Kerkam, Stowell, Kondracki & Clarke; William L. Feeney

[57] ABSTRACT

A magnetic conveyance system uses magnetic drivers within a tube having pressurized fluid moving therethrough. The magnetic drivers have magnets mounted at an angle other than 90 degrees to the central axis of the tube. Outside of the tube, a cart has a magnet thereon and is moved by magnetic force interaction when the driver is moved by pressure of the fluid, preferably a liquid such as water. A number of balls flow in the tube and keep the magnetic drivers spaced apart. The balls also serve to push the magnetic drivers as the balls are more directly pushed by the pressure of the fluid. A water wheel is connected by gears to an index wheel and serves to keep the balls, and thus the magnetic drivers and associated carts, moving in the proper direction. The carts may be configured as model cars, trucks, and other such vehicles which move on a board having a simulated road surface with the pressurized fluid tube mounted thereunder.

21 Claims, 5 Drawing Sheets

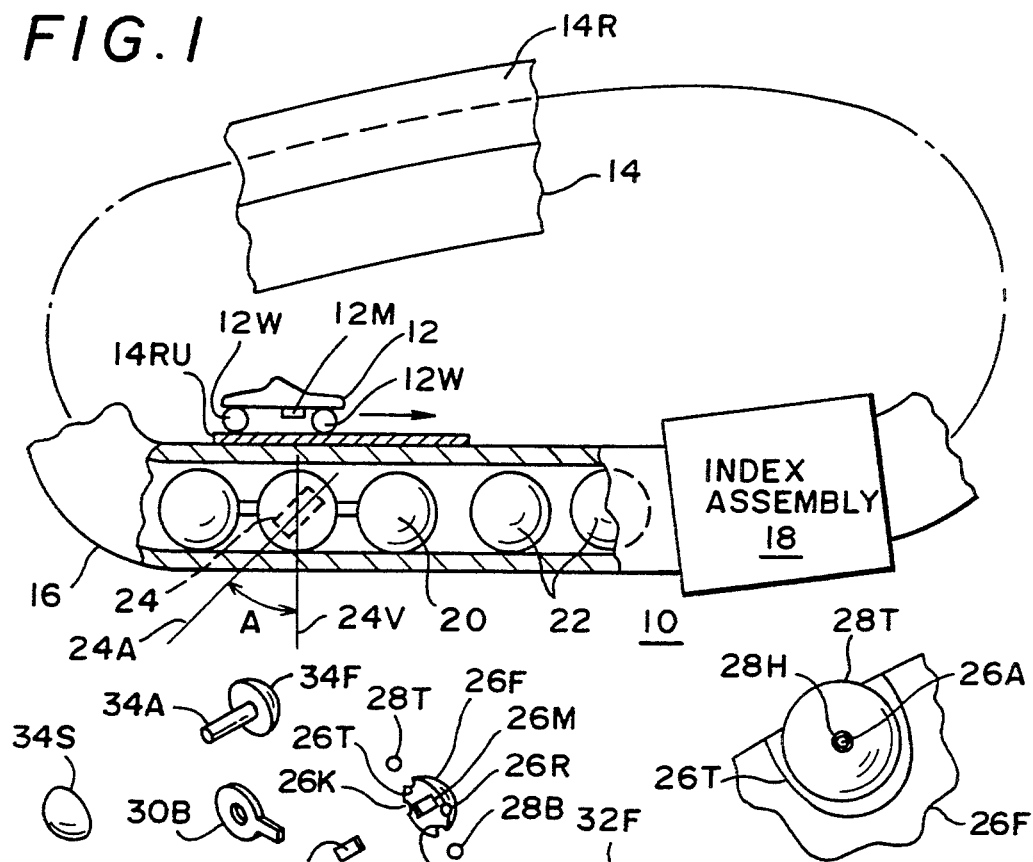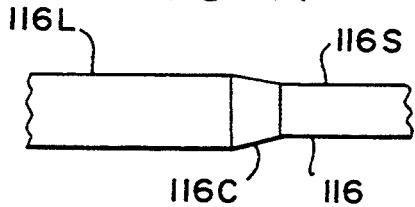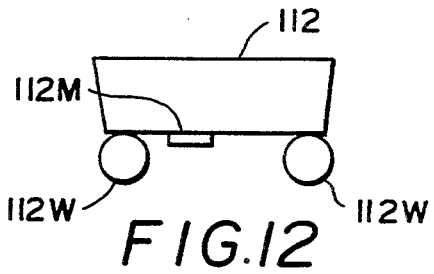

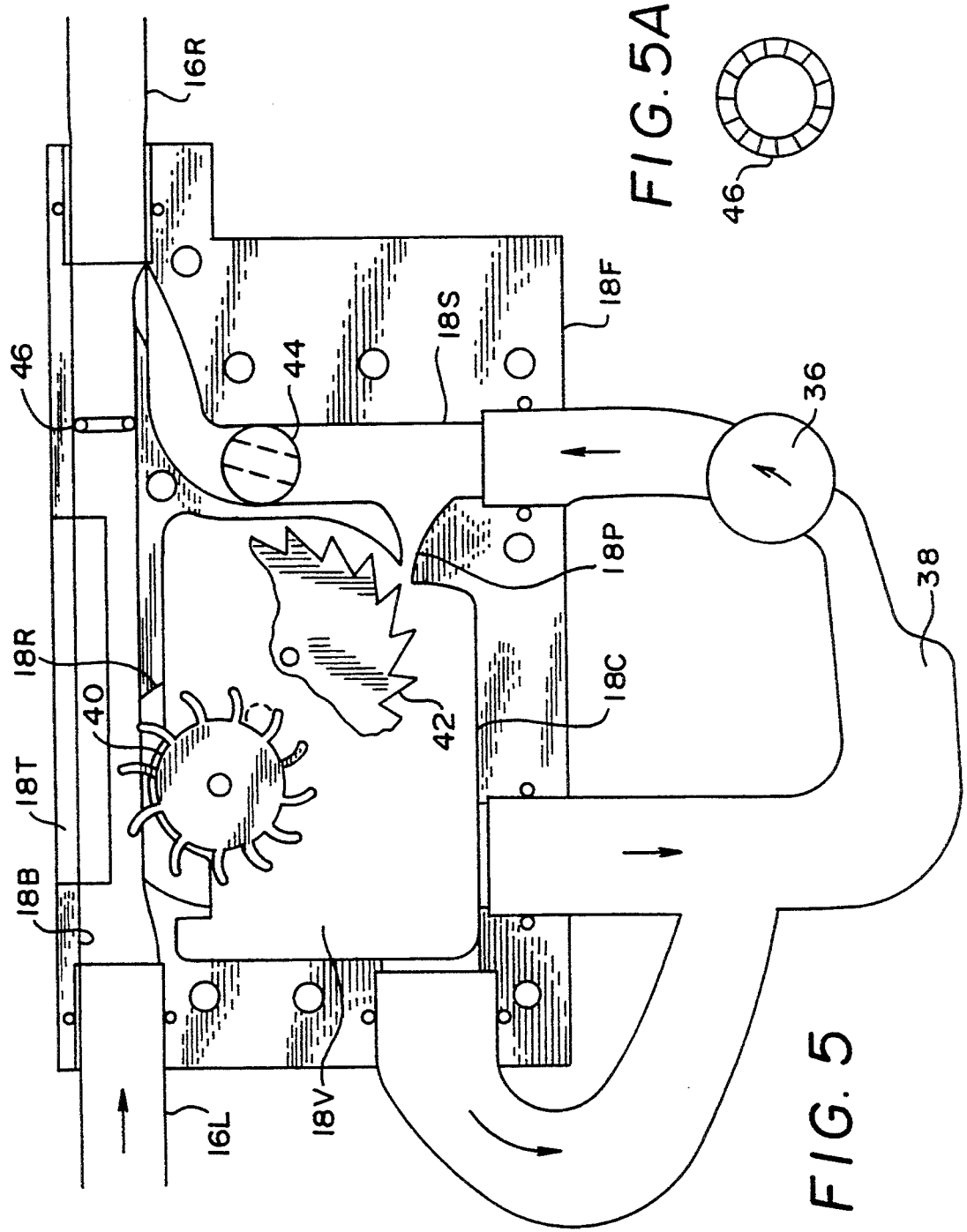

MAGNETIC CONVEYANCE SYSTEM

BACKGROUND OF THE INVENTION

This invention relates to a magnetic conveyance system. More particularly, it relates to a system wherein pressurized fluid within a tube moves a magnetic driver to, in turn, propel a cart outside of the tube.

The use of various magnetic and other conveyor systems are disclosed in numerous prior patents including:

| Patent No. | Inventor |
| --- | --- |
| 3,673,629 | Casey et al |
| 3,882,791 | Youngscap |
| 4,034,848 | Elliott |
| 4,113,202 | Ueno |
| 4,457,423 | Stoll |
| 4,725,256 | Sassak |

Although various prior conveyors have used magnets for moving items, there has remained an unmet need for conveyors which can efficiently move loads around a loop. Many prior designs have difficulties handling more than one load at a single time or handling multiple loads if they are too close to each other. Moreover, those designs which can handle multiple loads are often unable to have some loads travel at different speeds than other loads.

In another field, various toys have allowed children or adults to race model cars or other vehicles. However, such designs often require Separate tracks, such as slot car tracks, for different vehicles. Using more than one vehicle in a single track is often difficult or impossible. Because such designs do not generally provide for a vehicle in one lane to catch up to a vehicle in the same lane, they cannot simulate actual traffic conditions very well. Additionally, it is often difficult to adjust the speed of one vehicle relative to another and/or to adjust the speed of all vehicles easily. Finally, it may be difficult to provide for a speed differential at different parts of a track or course.

OBJECTS AND SUMMARY OF THE INVENTION

Accordingly, it is a primary object of the present invention to provide a new and improved magnetic conveyance system.

Yet another object of the present invention is to provide a new and improved magnetic toy vehicle system.

A still further object of the present invention is to provide a magnetic conveyance system in which one load or vehicle can travel at a different speed than another load or vehicle.

Yet another object is to provide a toy system which can simulate traffic conditions relatively well.

A still further object is to provide for convenient speed adjustment in a magnetic conveyance system.

A further object is to avoid or minimize the various problems noted with prior designs as discussed above.

The above and other objects of the present invention which will be apparent from the below description are realized by a magnetic conveyance system includes a fluid tube driver for movement in a tube filled with pressurized fluid and having a first front wheel, a first back wheel, a support structure mounted between and to the first front and back wheels with the first front and first back wheels rotatable with respect to the support structure, and a driver magnet mounted to the support structure and having a polarity axis which is angularly offset in a front-to-back direction from a vertical axis central to the fluid tube driver. The polarity axis is angularly offset between 30 and 75 degrees relative to the vertical axis. The magnetic conveyance system further includes a second front wheel and a second back wheel and the second front and second back wheels are rotatable with respect to the support structure. The first and second front wheels are coaxial and the first and second back wheels are coaxial.

The support structure includes a support ball in which the driver magnet is disposed, a front member having a hole therein with a front axle supported therein, and a back member having a hole therein with a back axle supported therein; and wherein the first and second front wheels are mounted to the front axle, and the first and second back wheels are mounted to the back axle. A top wheel and a bottom wheel are mounted on the support ball.

The magnetic conveyance system further includes a pressurized fluid tube and wherein the fluid tube driver is in the pressurized fluid tube. The magnetic conveyance system of further includes a cart outside of the pressurized fluid tube and magnetically coupled to move with the fluid tube driver. The cart has a cart magnet disposed thereon.

The cart is a toy vehicle in a first embodiment. In a second embodiment, the cart is a load carrying vehicle.

A plurality of free balls are within the pressurized fluid tube.

The magnetic conveyance system further includes a pump and an index assembly connected to the pump and to the pressurized fluid tube and including an index wheel and a pump bypass passageway, the index assembly having a supply side downstream from the index wheel and a return side upstream of the index wheel; and wherein the index assembly channels water from the return side to the pump and pushes the free balls and the fluid tube driver through the pump bypass passageway.

The pressurized fluid tube includes relatively fast sections having a relatively small cross-sectional area and relatively slow sections having a relatively large cross-sectional area.

The present invention may alternately be described as magnetic conveyance system includes: a pressurized fluid tube; a fluid tube driver within the pressurized fluid, the fluid tube driver includes a driver magnet; a pump; and an index assembly connected to the pump and to the pressurized fluid tube and including an index wheel and a pump bypass passageway, the index assembly having a supply side downstream from the index wheel and a return side upstream of the index wheel; and wherein the index assembly channels liquid from the return side to the pump and pushes the fluid tube driver through the pump bypass passageway. The magnetic conveyance system further includes a cart outside of the pressurized fluid tube and magnetically coupled to move with the fluid tube driver. The magnetic conveyance system wherein the pressurized fluid tube includes relatively fast sections having a relatively small cross-sectional area and relatively slow sections having a relatively large cross-sectional area.

The invention may alternately be used for creating light special effects. The system may include a plurality of magnetic flux operated switches positioned for closure by said magnetic fluid driver and each connected to one of a corresponding plurality of lights which turn on when said magnetic fluid driver passes adjacent the corresponding one of said switches.

BRIEF DESCRIPTION OF THE DRAWINGS

The above and other features of the present invention will be more readily understood when the following detailed description is considered in conjunction with the accompanying drawings wherein like characters represent like parts throughout and in which:

FIG. 1 is a simplified cross-section view with parts schematically illustration for explaining the operation of the present invention;

FIG. 2 is an exploded view of a fluid tube driver according to the present invention;

FIG. 2A shows an enlargement of a part of the driver of FIG. 2;

FIG. 3 is a top view of the fluid tube driver of FIG. 2;

FIG. 4 is a side view of the fluid tube driver of FIG. 2;

FIG. 5 is side view of parts of an index assembly according to the present invention;

FIG. 5A shows an end view of a ring used for sealing;

FIG. 11 is a side view of tubes used with the present invention;

FIG. 12 is a side view of a load carrying cart according to the present invention.

DETAILED DESCRIPTION

Figure 5B:
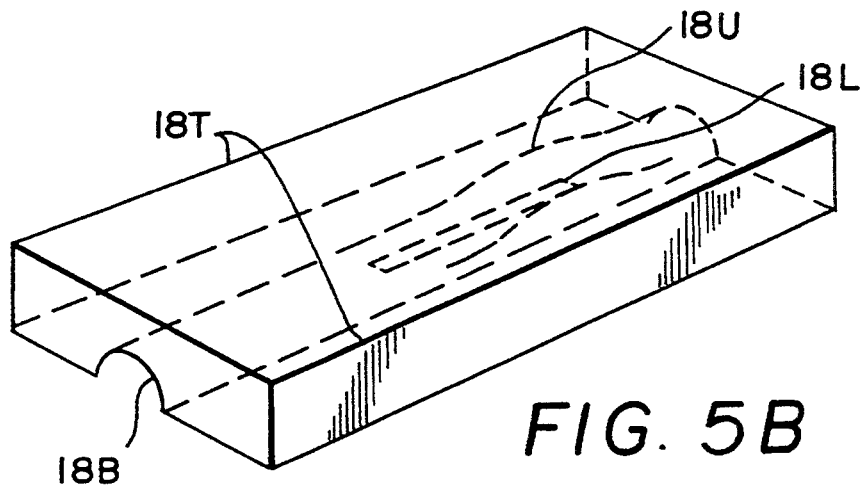
FIG. 5B is a perspective view of a top of the index assembly.

The present invention will initially be described with reference to FIG. 1, which shows a toy magnetic conveyance system according to the present invention. Although the discussion which follows will emphasize the magnetic conveyance techniques disclosed herein as used for powering model or toy vehicles, the techniques may also be used for load carrying carts in manufacturing, mining, or other industrial applications in which a conveyance system is useful.

The magnetic conveyance system 10 of FIG. 1 has a cart such as model car 12 having 4 wheels 12W and a cart magnet 12M mounted on the lower surface of the car. If desired, the magnet 12M may be mounted between the front pair of wheels 12W.

Model car 12 moves on a road 14R portion of a board 14 (only partially shown). The board 14 may be flat or include hills and valleys (not shown). Although not shown, the board 14 could include numerous individual boards mounted together to provide an upper surface for road 14R. A small portion 14RU of road 14R is shown under the car 12, but it will be understood that road 14R is continuous and forms a closed loop. Although not shown, various model buildings and other structures used on model railroad systems could be mounted on the board 14.

Under the road 14R of board 14 is a pressurized fluid pipe 16 extending in a closed loop except that an index assembly 18 connects opposite ends of pipe 16. The pipe 16 could be a single piece of pipe or multiple pipe sections joined together.

A magnetic fluid driver 20 is shown disposed within the pipe 16, it being understood that numerous such drivers would be within pipe 16 and would be separated by numerous free balls 22. The driver construction will be described in more detail below, but it will briefly be noted that the driver is like 3 connected balls.

Before describing construction details, an over view of the operation of the present invention will be given. The index assembly 18 has a pump (not shown in FIG. 1) attached to it to supply pressurized fluid, preferably water. The index assembly cooperates with the drivers 20 and free balls 22 to keep the fluid traveling in one direction in the tube 16. In turn, the water pushes the drivers 20 and free balls 22. Since each driver 20 has a driver magnet 24 mounted therein, movement of the driver 20 within tube 16 will, by magnetic attraction, move car 12 on the road 14R.

Advantageously, magnet 24 has an axis 24A of polarity (i.e., north to south direction) which is angularly offset in a front-to-back direction from a vertical axis 24V (i.e., vertical at horizontal portions of road 14R and tube 16). The offset angle A is 45 degrees in the preferred embodiment. More generally, the angle may be between 40 and 50 degrees. Even more generally, the invention may use an offset angle of 30 to 75 degrees.

The angular offset provides two important advantages. First, the angular offset prevents the magnetic flux from pulling the car 12 so tightly against the road 14R as to increase the friction of the car 12. (Such an undesirable increase in friction might occur if the polarity axis was vertical or normal to the road surface.) Second, the angle of magnet 24 creates a larger cross-section of flux for the car 12 to be attracted to. That is, the front-to-back extent of the window or zone of flux on the road surface is greater than would be the case if the polarity axis was vertical. This increased zone or window of flux reduces the chances that the car 12 will magnetically decouple or separate from driver 20 upon hitting a bump.

In FIG. 1, the driver 20 is moving to the right with its magnet 24 having its upper end ahead of the magnet 12M such that it pulls the car 12 forward to the right. The north end of magnet 24 could,for example, be at its upper end which is at the right. The magnet 12M would have a vertical axis of polarity (not shown) and have its south end down. (If one used the south end of magnet 24 up and in the direction of travel, then the north end of magnet 12M would constructed to be down.) Significantly, the magnets are neodymium magnets to provide strong magnetic force for a relatively low weight.

Although it is highly advantageous to have a magnet 12M on the cart (model vehicle or load carrying cart), the present invention as broadly understood contemplates using a car without a magnet and which is moved by ferromagnetic materials therein being attracted to the flux established by magnet 24. Also, the magnetic coupling to drive car 12 under power of driver 20 could be magnetic repulsion, instead of the magnetic attraction which is highly preferred.

Turning now to FIGS. 2, 2A, 3, and 4, the construction details of the driver 20 will be presented. The magnet 24 may be in the shape of a right angle parallelepiped which is disposed within a similarly shaped cavity 26M between identically constructed first and second ball halves 26F and 26S. The ball halves 26F and 26S serve as a support structure for the magnet 24.

In addition to the magnet 24 mounted between and within the ball halves 26F and 26S, spherical top and bottom wheels 28T and 28B are mounted within corresponding partially spherical cavities 26T and 26B respectively. As shown in the enlargement of FIG. 2A, the wheel 28T has a cylindrical hole 28H which holds it for rotation relative to an axle 26A of part 26F. Axle 26A would be a half axle mating to a similar half axle (not shown) of part 26S. Wheel 28B would be mounted in similar fashion to wheel 28T. The top and bottom wheels 28T and 28B minimize any friction against the ball halves 26F and 26S.

As best shown in the exploded view of FIG. 2, identically constructed front and back members 30F and 30B respectively mount in corresponding cavities 26R and 26K in ball half 26F (and similar unshown cavities in ball half 26S). As shown, front member 30F has an arm 30A with a ring 30R mounted thereon. A hole 30H is disposed in ring 30R and receives a front axle 32A which rotates with first and second front wheels 32F and 32S. Rear wheels 34F and 34S mount in the same way to axle 34A which turns relative to member 30B.

All of the parts of driver 20 are preferably made of plastic except the magnet 24. The parts may be glued together or solvent may be used to fuse the various parts together. Parts 26F, 26S, 30F, 30B, and 24 are fixed relative to each other, whereas wheels 32F and 32S turn with their axle 32A and wheels 34F and 34S turn with their axle 34A. Wheels 28T and 28B turn with respect to the support structure or ball made of ball halves 26F and 26B.

Each of wheels 32F, 32S, 34F, and 34S is shaped like a portion of a sphere such that wheels 32F and 32S together are generally spherical as are wheels 34F and 34S together. Likewise, ball halves 26F and 26S form a sphere. All three of the spheres formed by these wheels and ball halves are just under in diameter the size of the free balls 22 (FIG. 1 only) and will serve a valving function in connection with passage of driver 20 through the index assembly 18 of FIG. 1.

Advantageously, the shape of the driver 20 allows it be self-aligning. That is, the magnet 24 will cooperate with magnet 12M (FIG. 1) to cause the driver 20 to assume its proper orientation shown in FIG. 1.

Turning now to FIG. 5, a first housing half 18F of the index assembly is shown, it being understood that an identically constructed unshown second housing half would be adhered to the preferably molded plastic half 18F. The index assembly allows the balls 22 and drivers 20 to pass through a pump bypass passageway 18B, while water passes around the passageway 18B under the power of pump 36 drawing from reservoir 38. Pump 36 and reservoir 38 are shown schematically and are connected by the illustrated pipes or hoses to index half 18F. Since the various balls do not pass through the pump, it may be any of various known and relatively inexpensive water pump constructions.

Pump 36 sends pressurized water through supply passageway 18S out the right side 16R of tube 16. The water travels in a loop defined by hose or tube 16 and returns to index half 18F by left side or end 16L of tube 16. It carries the drivers 20 and balls 22 (both FIG. 1, not shown in FIG. 5) along the same path. The drivers 20 would in turn pull the car 12 or similar vehicles or carts in a path along the top of tube 16.

When the balls 22 and the three ball-like sections of drivers 20 shown in FIG. 1 enter the index housing 18 from the left side tube 16L, each will serve as a valve to gate water down into cavity 18C since passageway 18B is smaller in diameter than tube 16. Further, the suction of pump 36 will pull water through a return passageway 18R into cavity 18C. In order to keep the balls and drivers moving rightwardly in FIG. 5, circumferentially symmetric index and water wheels 40 and 42 (both only partially shown for ease of illustration) would be turning clockwise. Water wheel 42 is turned by pressurized water passing through power passageway 18P, with water valve 44 controlling the balance of pressure supplied to water wheel 42 and tube right end 16R. Water wheel turns index wheel 40 in a continuous motion by way of an unshown gear train, discussed below. Index wheel 40 moves the balls 22 and drivers 20 through passageway 18B against the back pressure of water at supply passageway 18S.

A rubber O ring 46 is disposed at the right side of passageway 18B and seals against water passing leftwardly in passageway 18B since a ball 22 or one of the ball-like sections of driver 20 will always be seated against the right side of ring 46. Although not shown, more than one such O ring may be used at the right side of passage 18B. If desired, the ring may be constructed as shown in FIG. 5A with a plurality of sections with radial slits which allow passage of the balls in one direction, but which block their passage in the other direction and which seal out water from flowing in the wrong direction. A removable top 18T allows one to place balls 22 and drivers 20 in passage 18B of the index assembly 18. A check valve 18V serves as an air inlet.

Figure 5C:
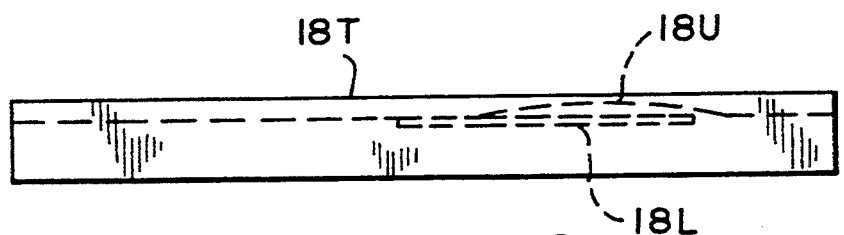
FIG. 5C is a side view of the top.
Figure 5D:
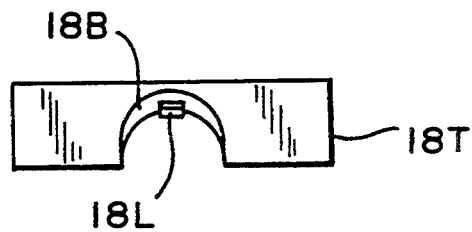
FIG. 5D is an end view of the top.
Figure 5E:
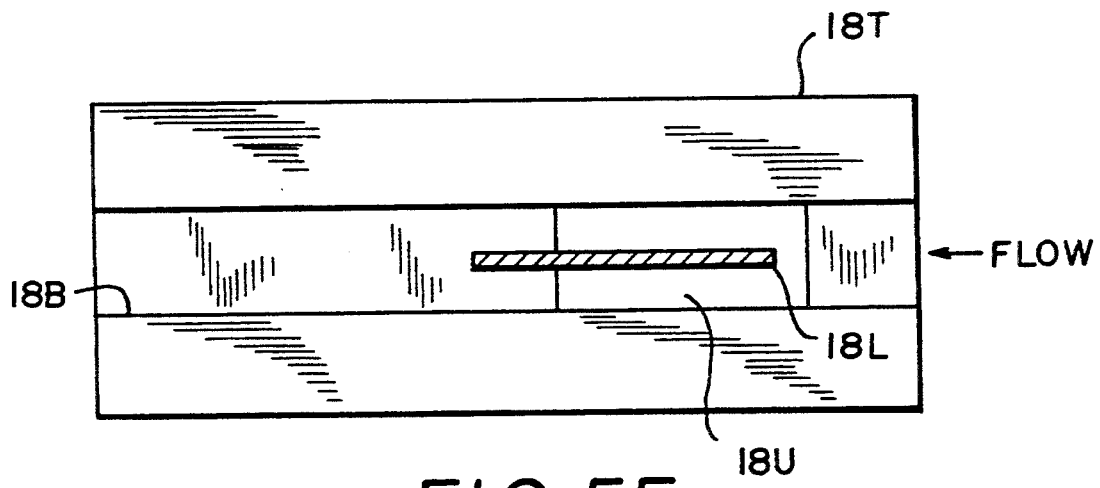
FIG. 5E is a bottom view of the top.

The perspective view of FIG. 5B, side view of FIG. 5C, end view of FIG. 5D, and bottom view of FIG. 5E show details of the top 18T. That portion (the upper portion) of passage 18B within top 18T includes an upper cavity 18U extending above the passage 18B and having a leaf spring 18L anchored at its left side (FIGS. 5B, 5C, and 5E) by attachment to top 18T along the top of passage 18B. Note that FIGS. 5B, 5C, and 5E are from the opposite point of view from FIG. 5 such that flow is right-to-left therein.

When the index wheel 40 of FIG. 5 pushes balls up and rightwardly (in FIG. 5, leftwardly in FIGS. 5B, 5C, and 5E), the leaf spring 18L is just above wheel 40 and prevents jamming by allowing balls 22 (and parts of driver 20) to rise slightly into upper cavity 18U.

Figure 8:
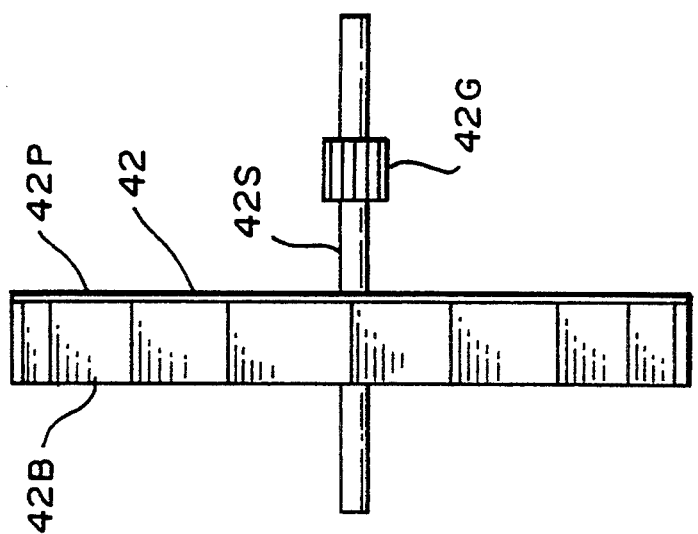
FIG. 8 is an end view of the water wheel and a gear commonly mounted therewith.
Figure 7:
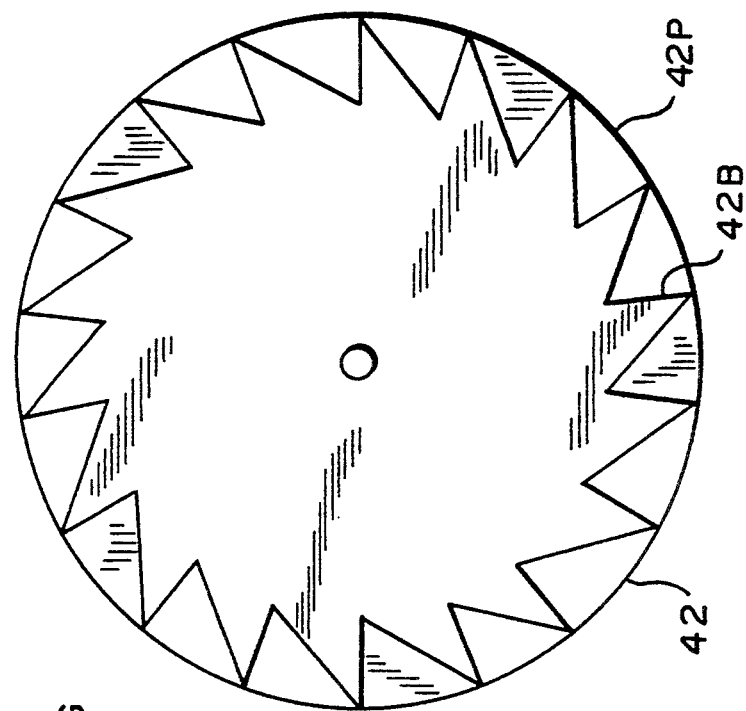
FIG. 7 is a side view of a water wheel of the index assembly.
Figure 6:
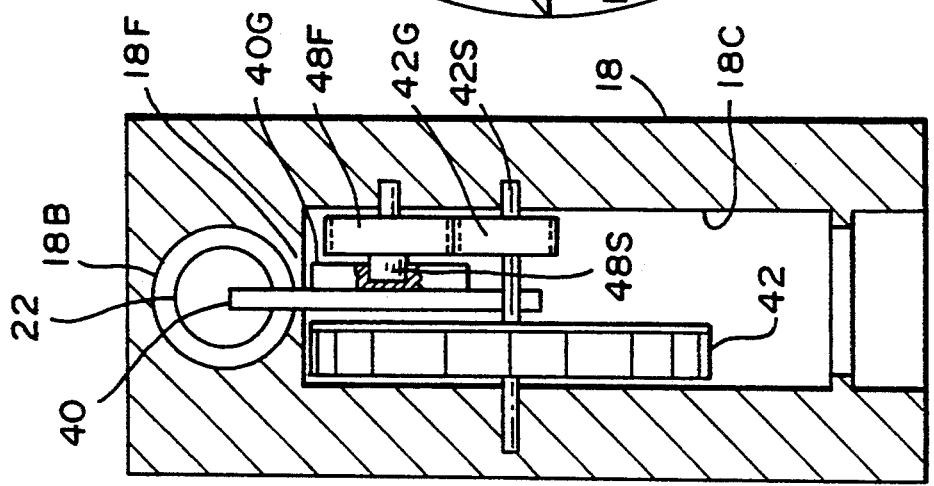
FIG. 6 is an end view of a gear train and related parts of the index assembly.
Figure 10:
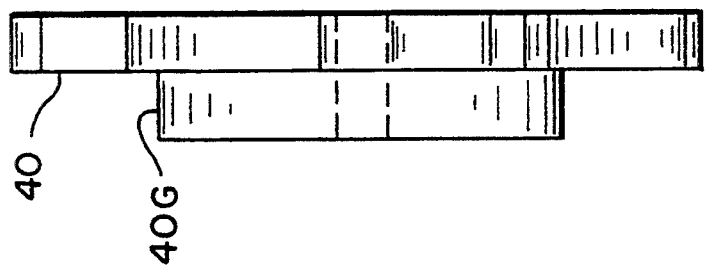
FIG. 10 is an end view of the index wheel and associated gear.
Figure 9:
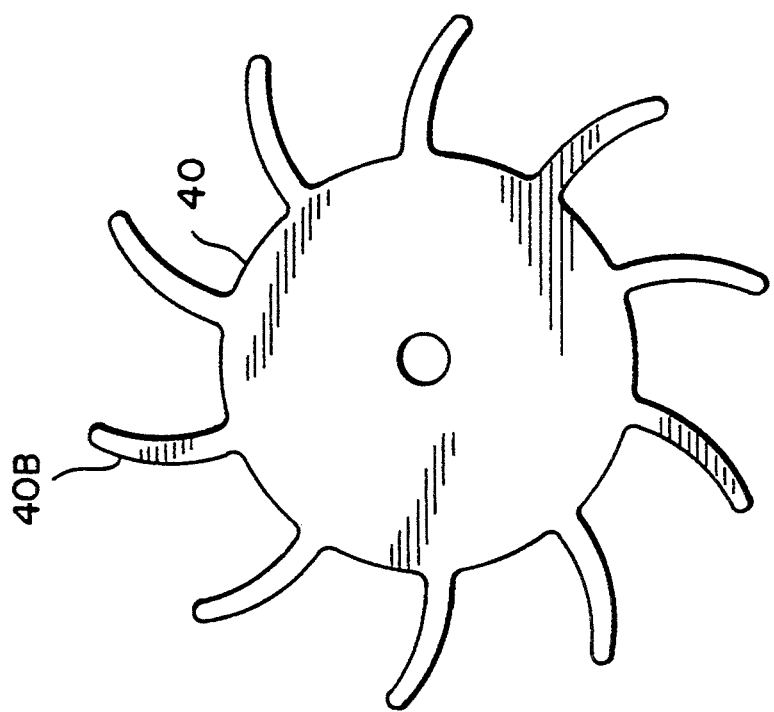
FIG. 9 is a side view of an index wheel of the index assembly.

Turning now to FIGS. 6–10, the relationship and operation of index wheel 40 and water wheel 42 will be discussed. The water wheel 42 has 18 paddles 42P mounted to a flat plate 42L and is fixed to shaft 42S also having 7 teeth gear 42G mounted thereto (FIGS. 7 and 8). Movement of the water wheel 42 moves gear 42G which in turn moves 48 teeth gear 48F with shaft 48S moving 7 teeth gear 48S (FIG. 6). The gear 48S meshes to 48 teeth gear 40G fixed to rotate with the index wheel 40. The index wheel 40 has arcuate blades 40B which push the balls rightwardly in FIG. 5. Since the index wheel is acetal or similar plastic, the blades 40B flex as springs and avoid jamming of the balls in passage 18B. The index wheel 40 preferably has a gear ratio of 2 to 1, as does the water wheel 42. The arrangement increases the torque and decreases the speed of rotation from water wheel 42 to index wheel 40.

Turning next to FIG. 11, an alternate tube 116 may include a large section 116L and a smaller diameter section 116S connected by portion 116C. The speed of a driver 20 passing through 116 will increase as it gets into the small section 116S.

In addition to being dependent on the size of the tube, the speed will depend on the number of balls 22 of FIG. 1 behind a driver 20 and the setting on the speed control valve 44 (FIG. 5). A driver 20 with one or two balls behind it will move relatively slowly, whereas a driver 20 with ten to fifteen of the balls 22 behind it will move more quickly and can catch up to a moving vehicle in front of it. The balls 22 space apart the drivers 20 to prevent them from magnetically coupling to each other, as well as helping the water pressure to push the drivers 20. Of course, the balls also provide the valving function in connection with the index assembly 18.

FIG. 12 shows an alternate to the model car type cart of FIG. 1. The cart 112, which is a load carrying cart (meaning a cart used for transporting loads, not a toy), has four wheels 112W and a neodymium magnet 112M with a force of up to 600 pounds weight per magnet. It would be operated by a magnetic fluid driver like the driver 20 of FIG. 1 moving in a tube like 16 of FIG. 1. However, instead of moving along a simulated road like the toy cart or car 12 of FIG. 1, the cart 112 could be used for carrying materials used in an industrial process, such as parts to be assembled in an assembly line. Alternately, the cart 112 could be a shopping cart (not shown as such) and the magnetic fluid drivers could be sent periodically through tubes under a parking lot to return the shopping carts to a central location.

Figure 13:
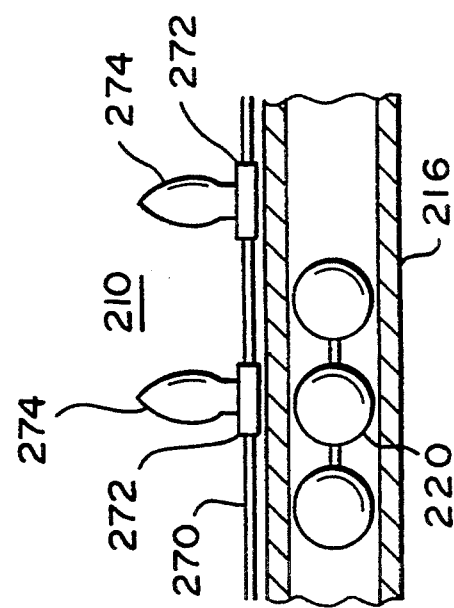
FIG. 13 shows an alternate embodiment magnetic conveyance system having a special effects light system as a part thereof.

FIG. 13 shows a magnetic driver 220 moving in a tube 216 (constructed respectively in the same fashion as driver 20 and tube 16) along side of wire 270 which carries electricity to combined lamp base-magnetic switch units 272 and light bulbs 274. When the driver 220 passes by each unit 272, the magnetic flux closes a magnetic flux sensing switch of known construction disposed therein so as to light bulb 274. A series of bulbs 274 may thus be sequentially turned on to create moving light effects. Thus, the relatively inexpensive magnetic conveyance system 210 of FIG. 13 conveys driver 220 in order to convey a turn on signal of magnetic flux to the various lights.

Although various specific constructions and details are included herein, it is understood that these are for illustrative purposes only. Various modifications and adaptations will be apparent to those of skill in the art. Accordingly, the scope of the present invention should be determined with reference to the claims appended hereto.

What is claimed is:

1. A magnetic conveyance system comprising: a fluid tube driver for movement in a tube filled with pressurized fluid and having a first front wheel, a first back wheel, a support structure mounted between and to said first front and back wheels with said first front and first back wheels rotatable with respect to said support structure, and a driver magnet mounted to said support structure and having a polarity axis which is angularly offset in a front-to-back direction from a vertical axis central to said fluid tube driver, and wherein said support structure includes a support between said first front wheel and said first back wheel, said driver magnet centrally disposed between said first front wheel and said first back wheel, a front member having a hole therein with a front axle supported therein, and a back member having a hole therein with a back axle supported therein; and wherein said first front wheel is mounted to said front axle, and said first back wheel is mounted to said back axle.

2. The magnetic conveyance system of claim 1 wherein said polarity axis is angularly offset between 30 and 75 degrees to said vertical axis.

3. The magnetic conveyance system of claim 1 further comprising a second front wheel and a second back wheel and said second front and second back wheels are rotatable with respect to said support structure.

4. The magnetic conveyance system of claim 3 wherein said first and second front wheels are coaxial and said first and second back wheels are coaxial.

5. A magnetic conveyance system comprising a fluid tube driver for movement in a tube filled with pressurized fluid and having a first front wheel, a first back wheel, a support structure mounted between and to said first front and back wheels with said first front and first back wheels rotatable with respect to said support structure, and a driver magnet mounted to said support structure and having a polarity axis which is angularly offset in a front-to-back direction from a vertical axis central to said fluid tube driver, and further comprising a second front wheel and a second back wheel and said second front and second back wheels are rotatable with respect to said support structure, and wherein said first and second front wheels are coaxial and said first and second back wheels are coaxial, and wherein said support structure includes a support ball in which said driver magnet is disposed, a front member having a hole therein with a front axle supported therein, and a back member having a hole therein with a back axle supported therein; and wherein said first and second front wheels are mounted to said front axle, and said first and second back wheels are mounted to said back axle.

6. The magnetic conveyance system of claim 5 further comprising a top wheel and a bottom wheel mounted on said support ball.

7. The magnetic conveyance system of claim 5 further comprising a pressurized fluid tube and wherein said fluid tube driver is in said pressurized fluid tube.

8. The magnetic conveyance system of claim 7 further comprising a cart outside of said pressurized fluid tube and magnetically coupled to move with said fluid tube driver.

9. The magnetic conveyance system of claim 8 wherein said cart has a cart magnet disposed thereon.

10. The magnetic conveyance system of claim 8 wherein said cart is a toy vehicle.

11. The magnetic conveyance system of claim 8 wherein said cart is a load carrying vehicle.

12. The magnetic conveyance system of claim 8 further comprising a plurality of free balls within said pressurized fluid tube.

13. The magnetic conveyance system of claim 8 further comprising a pump and an index assembly connected to said pump and to said pressurized fluid tube and including an index wheel and a pump bypass passageway, said index assembly having a supply side downstream from said index wheel and a return side upstream of said index wheel; and wherein said index assembly channels water from the return side to said pump and pushes said free balls and said fluid tube driver through said pump bypass passageway.

14. A magnetic conveyance system comprising a fluid tube driver for movement in a tube filled with pressurized fluid and having a first front wheel, a first back wheel, a support structure mounted between and to said first front and back wheels with said first front and first back wheels rotatable with respect to said support structure, and a driver magnet mounted to said support structure and having a polarity axis which is angularly offset in a front-to-back direction from a vertical axis central to said fluid tube driver, and further comprising a pressurized fluid tube and wherein said fluid tube driver is in said pressurized fluid tube; and further comprising a plurality of magnetic flux operated switches positioned for closure by said magnetic fluid driver and each connected to one of a corresponding plurality of lights which turn on when said magnetic fluid driver passes adjacent the corresponding one of said switches.

15. A magnetic conveyance system comprising a fluid tube driver for movement in a tube filled with pressurized fluid and having a first front wheel, a first back wheel, a support structure mounted between and to said first front and back wheels with said first front and first back wheels rotatable with respect to said support structure, and a driver magnet mounted to said support structure and having a polarity axis which is angularly offset in a front-to-back direction from a vertical axis central to said fluid tube driver, and wherein said support structure includes a support ball in which said driver magnet is disposed, a front member having a hole therein with a front axle supported therein, and a back member having a hole therein with a back axle supported therein; and wherein said first front wheel is mounted to said front axle, and said first back wheel is mounted to said back axle.

16. A magnetic conveyance system comprising a fluid tube driver for movement in a tube filled with pressurized fluid and having a first front wheel, a first back wheel, a support structure mounted between and to said first front and back wheels with said first front and first back wheels rotatable with respect to said support structure, and a driver magnet mounted to said support structure and having a polarity axis which is angularly offset in a front-to-back direction from a vertical axis central to said fluid tube driver, and further comprising a pressurized fluid tube and wherein said fluid tube driver is in said pressurized fluid tube.

17. The magnetic conveyance system of claim 16 further comprising a pump and an index assembly connected to said pump and to said pressurized fluid tube and including an index wheel and a pump bypass passageway, said index assembly having a supply side downstream from said index wheel and a return side upstream of said index wheel; and wherein said index assembly channels liquid from the return side to said pump and pushes said fluid tube driver through said pump bypass passageway.

18. The magnetic conveyance system of claim 16 wherein said pressurized fluid tube includes relatively fast sections having a relatively small cross-sectional area and relatively slow sections having a relatively large cross-sectional area.

19. A magnetic conveyance system comprising: a pressurized fluid tube; a fluid tube driver within said pressurized fluid tube, said fluid tube driver includes a driver magnet; a pump; and an index assembly connected to said pump and to said pressurized fluid tube and including an index wheel and a pump bypass passageway, said index assembly having a supply side downstream from said index wheel and a return side upstream of said index wheel; and wherein said index assembly channels liquid from the return side to said pump and pushes said fluid tube driver through said pump bypass passageway.

20. The magnetic conveyance system of claim 19 further comprising a cart outside of said pressurized fluid tube and magnetically coupled to move with said fluid tube driver.

21. The magnetic conveyance system of claim 19 wherein said pressurized fluid tube includes relatively fast sections having a relatively small cross-sectional area and relatively slow sections having a relatively large cross-sectional area.

* * * * *